March 11, 1930.　　　J. E. PALMER　　　1,749,886
COLLAPSIBLE TIRE BUILDING FORM
Filed Sept. 23, 1927　　3 Sheets-Sheet 1

INVENTOR.
John E. Palmer
BY Ely & Barrow
ATTORNEYS.

March 11, 1930.  J. E. PALMER  1,749,886
COLLAPSIBLE TIRE BUILDING FORM
Filed Sept. 23, 1927  3 Sheets-Sheet 2

INVENTOR.
JOHN E. PALMER
BY Ely & Barrow
ATTORNEYS

March 11, 1930.  J. E. PALMER  1,749,886
COLLAPSIBLE TIRE BUILDING FORM
Filed Sept. 23, 1927   3 Sheets-Sheet 3

INVENTOR.
John E. Palmer
BY Ely & Barrow
ATTORNEYS.

Patented Mar. 11, 1930

1,749,886

UNITED STATES PATENT OFFICE

JOHN E. PALMER, OF AKRON, OHIO, ASSIGNOR TO THE SUMMIT MOLD & MACHINE COMPANY, OF AKRON, OHIO, A CORPORATION OF OHIO

COLLAPSIBLE TIRE-BUILDING FORM

Application filed September 23, 1927. Serial No. 221,483.

This invention relates to the construction of collapsible cores or forms, such as used in the manufacture of pneumatic automobile tires. In the manufacture of these tires, it is customary to provide a core or form upon which the several layers of fabric are built up to constitute the carcass or body of the tire. Tires of the prevailing type are provided with inextensible beads which make it necessary to divide the core into a plurality of sections which are removable from the interior of the tire after its completion and to permit the insertion of an inner expansible core upon which the tire is vulcanized.

Collapsible cores for this purpose have been known heretofore, the object of the present invention being to construct and devise a form of collapsing mechanism which is superior to collapsing mechanisms known and used heretofore. The purposes of the invention are to improve upon the collapsible mechanism, obtaining greater simplicity and speed of operation, the manipulation of a single mechanism being all that is required to secure the complete collapsing of the core, and also the re-erection of the core from its collapsed condition.

In the drawings and in the specification is shown and described the improved collapsible core, in its preferred form as perfected, it being understood, however, that the invention may be embodied in other forms and modifications which contain the patentable features hereof, and it is understood that such changes and modifications as fall within the scope of the invention are intended to be covered herein.

Figure 4:
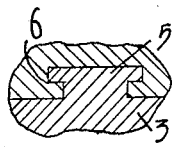
Figure 4 is a detail on the line 4—4 of Figure 1.

The collapsible core comprises a plurality of sections 1, 2, 3 and 4, the sections 1 and 3 being the larger or major sections placed opposite one another, and the sections 2 and 4 being smaller, intermediate or key sections fitting between the ends of the major sections. The key sections have a sliding, interlocking fit with the major sections, this construction being illustrated in Figure 4, in which the larger section 3 is shown as provided with a tenon or shouldered rib 5 and the smaller section with a guideway or slideway 6. The key sections are tapered outwardly of the core, so as to permit their removal inwardly thereof and to permit the approach of the major sections.

Figure 1:
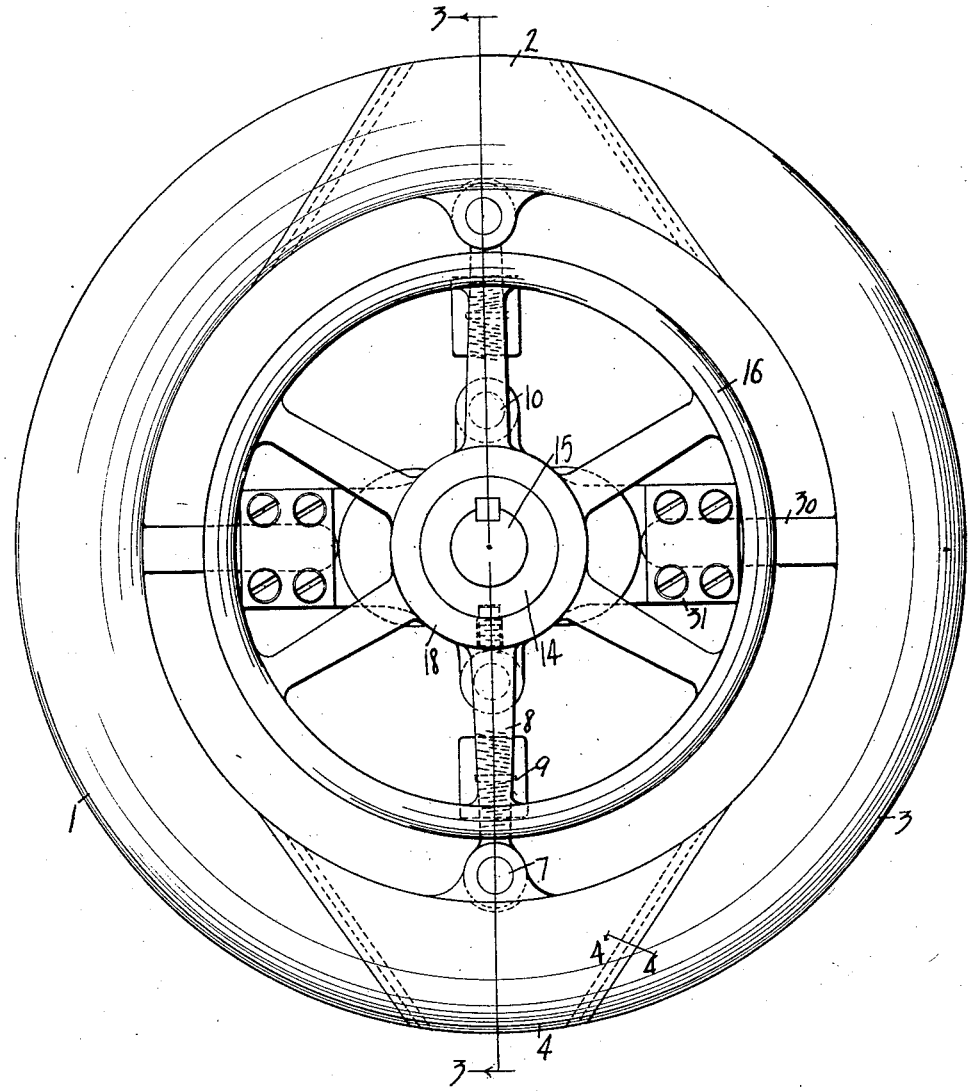
Figure 1 is a view of the core in erected or circular condition and in the position it occupies when the tire is to be built thereon.
Figure 2:
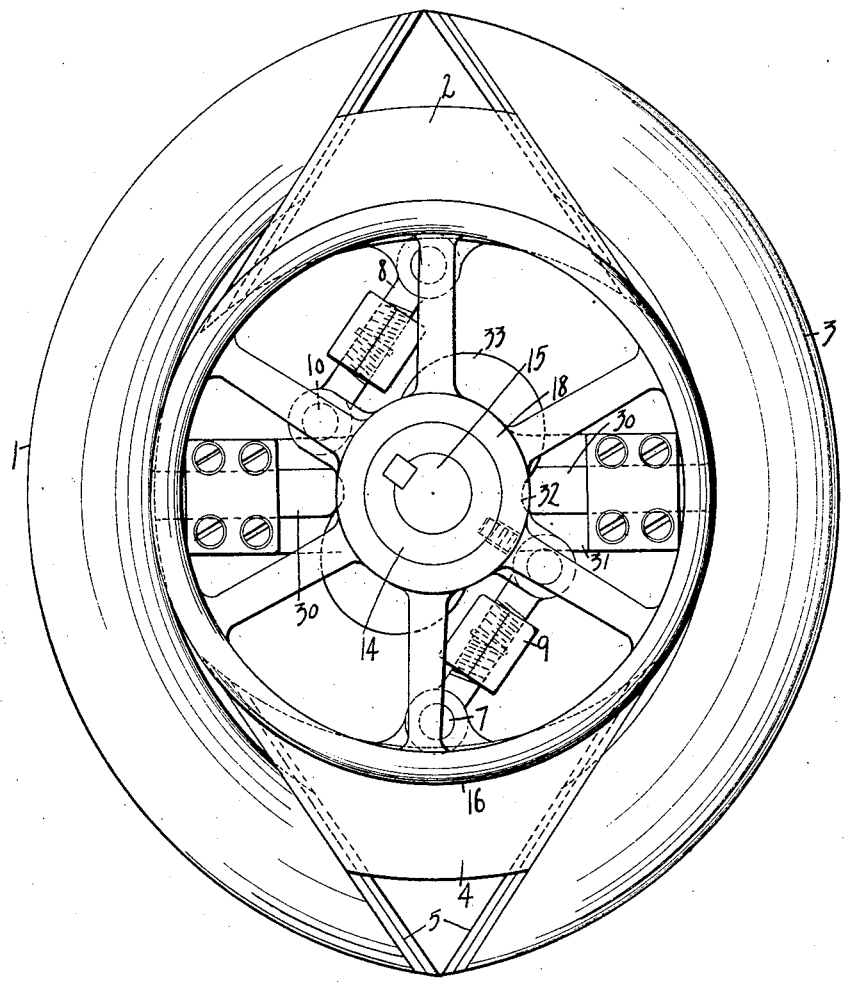
Figure 2 is a view of the core in collapsed position.
Figure 3:
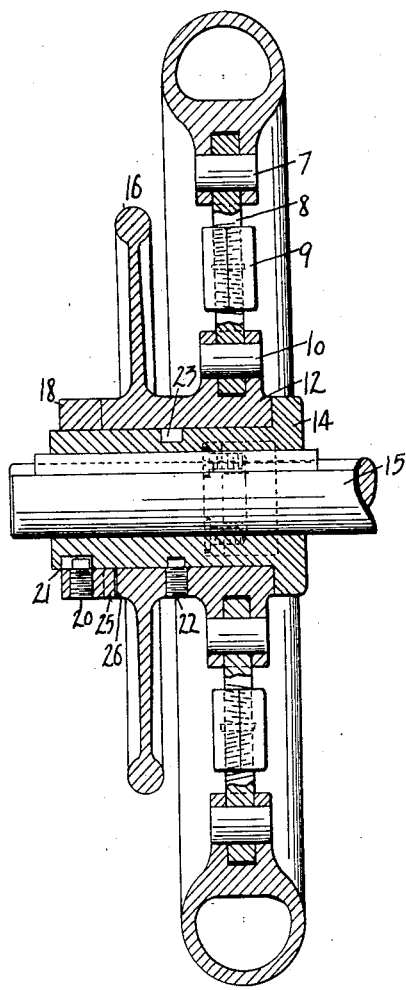
Figure 3 is a cross-section on the line 3—3 of Figure 1.

The key sections are each pivoted at 7 to a link 8, which is adjustable to vary its effective length by means of a turn-buckle 9. The link is pivoted at its inner end, as shown at 10, to a sleeve 12, which is rotatably mounted on a hub member 14 keyed to the shaft 15 upon which the core is mounted and by which it may be rotated. The sleeve is formed with an operating handle or wheel 16 and is confined by shiftable collar 18 on the end of the hube 14, the collar being mounted upon the hub for a limited axial movement by a stud 20 which enters a slot 21 in the hub. The sleeve is prevented from movement axially upon the hub by a stud 22 which engages a groove 23 about the hub. It is locked against rotation upon the hub except when it is desired to collapse or re-erect the core by a projection or tooth 25 upon the collar 18 which enters a recess 26 on the sleeve. When the core is to be operated, the collar is moved outwardly until the tooth is out of engagement with the recess. When the core is expanded or erected, the tooth is in register with the notch or recess 26 and the collar can be moved inwardly to lock and hold the core. As the operating hub is rotated from the position shown in Figure 1 to that shown in Figure 2, the sections 2 and 4 are drawn inwardly by the pivoted link and the sections 1 and 3 are moved inwardly by the sliding engagement of the ends of the sections. In its collapsed position, as shown in Figure 2, the core is sufficiently reduced in diameter to permit the removal of the tire.

In order to support and guide the intermediate sections and to prevent tilting of these sections with consequent cramping and to facilitate the operation of the core, each of these sections is provided with an inwardly extending arm 30 which is received within a radial guideway 31 carried upon the relatively stationary hub 14. The inner ends of the arms are each formed with a rounded bearing 32 which lies within the path of a rotating cam 33 formed upon the sleeve 12, so that as the sleeve is rotated from collapsed position, the cam will force the major sections outwardly and thereby relieve the key sections from a position of their wedging functions. If desired, this cam may be easily modified to insure the inward movement of the sections as well as their outward movement, such a modification not being essential, but may contribute to the easy and effective operation of the collapsible core. The several core sections may be detachably secured to the collapsing mechanism if it is desired to render the core interchangeable for various styles or cross-sections.

What is claimed:

1. A collapsible tire building form, comprising an endless form body divided into a plurality of sections, certain of said sections being major sections and other sections being key sections and tapered outwardly of the form, the sections having permanent end sliding and interlocking connections, and mechanism at the center of the form to withdraw the key sections, the major sections being moved toward the axis of the form by the inward movement of the key sections.

2. A collapsible tire building form, comprising an endless form body divided into a plurality of sections, certain of said sections being major sections and other sections being key sections and tapered outwardly of the form, the sections having end sliding and interlocking connections, and mechanism at the center of the form to withdraw the key sections, the major sections being moved toward the axis of the form by the inward movement of the key sections.

3. A collapsible tire building form, comprising an endless form body divided into a plurality of sections, certain of said sections being major sections and the other sections being key sections tapered outwardly of the form, a rotary member at the center of the core, links extending from the member to the key sections, and permanent connections between the key sections and the major sections to withdraw said sections simultaneously toward the center of the form.

4. A collapsible tire building form, comprising an endless form body divided into a plurality of sections, certain of said sections being major sections and the other sections being key sections tapered outwardly of the form, a rotary member at the center of the core, links extending from the member to the key sections, and interlocking sliding formations at the ends of the key sections and the major sections to withdraw said sections simultaneously toward the center of the form.

5. A collapsible tire building form, comprising a form body divided into a plurality of sections, certain of said sections being major sections and the other sections being key sections tapered outwardly of the form, a rotary member at the center of the core, links extending from the member to the key sections, permanent connections between the key sections and the major sections to withdraw said sections simultaneously toward the center of the form, and a cam formation on the rotary member in contact with the major sections.

6. A collapsible tire building form, comprising a form body divided into a plurality of sections, certain of said sections being major sections and the other sections being key sections tapered outwardly of the form, a rotary member at the center of the core, links extending from the member to the key sections, interlocking sliding formations at the ends of the key sections and the major sections to withdraw said sections simultaneously toward the center of the form, and a cam formation on the rotary member in contact with the major sections.

7. A collapsible tire building form, comprising a form body divided into a plurality of sections in end to end contact when the form is erected, certain of said sections being tapered outwardly of the form and other sections being tapered inwardly of the form, and means connected to certain of said sections to move all of said sections simultaneously toward and from the axis of the form, the other sections having permanent sliding interlocking connections with the said certain sections to be operable thereby.

8. A collapsible tire building form, comprising a form body divided into a plurality of sections in end to end contact when the form is erected, certain of said sections being tapered outwardly of the form and other sections being tapered inwardly of the form, means to move all of said sections simultaneously toward and from the axis of the form, the sections having permanent sliding interlocking connections, and a supplementary means to force the sections which are inwardly tapered away from the axis of the form as the form is erected.

9. A collapsible tire building form, comprising a hub, a rotary sleeve upon the hub, a plurality of form sections in end to end relation when the form is expanded, links extending from the sleeve to certain of said sections, and cams upon the sleeve, the remaining sections having portions in contact with the cams.

10. A collapsible tire building form, comprising a hub, a rotary sleeve upon the hub, a plurality of form sections in end to end relation when the form is expanded, links extending from the sleeve to certain of said sections, and cams upon the sleeve, the remaining sections having portions in contact with the cams and all of said sections having sliding interlocking connections.

11. A collapsible tire building form, comprising a hub, a rotary sleeve upon the hub, a plurality of form sections in end to end relation when the form is expanded, links extending from the sleeve to certain of said sections, and cams upon the sleeve, the remaining sections having portions in contact with the cams and all of said sections having permanent sliding interlocking connections.

12. A collapsible tire building form, comprising a plurality of sections, including a movable key section of wedge shape and movable sections adjoining the key section, means to move the key section toward and from the form axis, and means comprising interlocking formations on the ends of the key section and the adjacent ends of the adjoining sections for moving said adjoining sections by the key section.

JOHN E. PALMER.